Jan. 5, 1971 R. W. BERRY, JR 3,551,978
ROTARY END MILL CUTTER
Filed Oct. 31, 1968
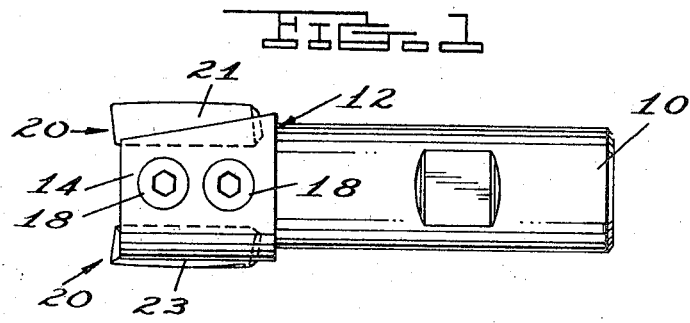
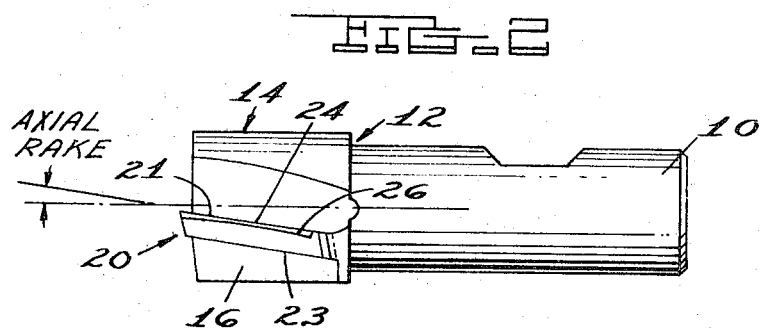
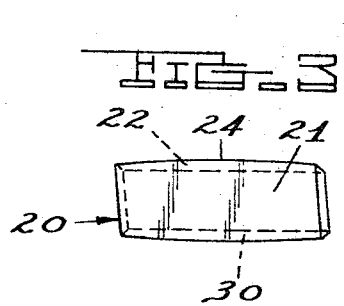
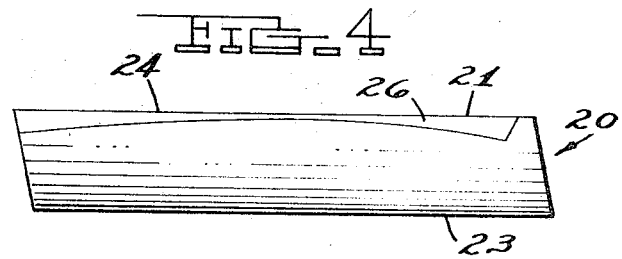
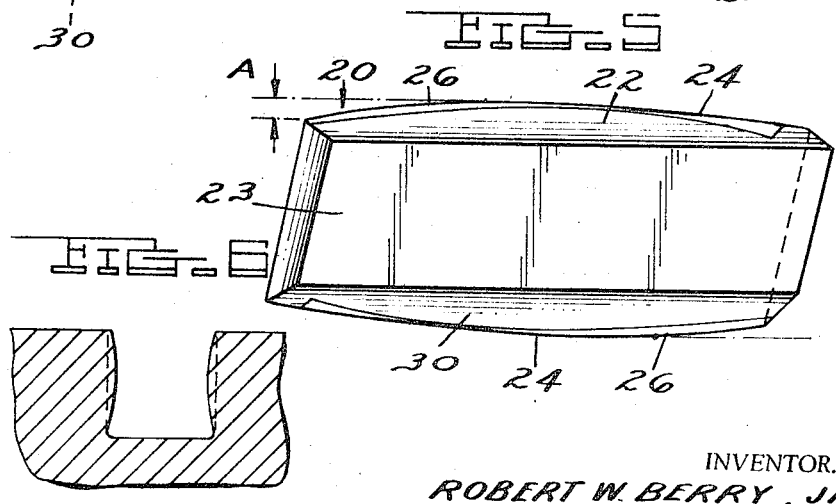
INVENTOR.
ROBERT W. BERRY, JR.
BY
Barnes, Kisselle, Raisch & Choate
ATTORNEYS

United States Patent Office 3,551,978
Patented Jan. 5, 1971

3,551,978
ROTARY END MILL CUTTER
Robert W. Berry, Jr., Ferndale, Mich., assignor to Fansteel Inc., North Chicago, Ill., a corporation of New York
Filed Oct. 31, 1968, Ser. No. 772,216
Int. Cl. B26d 1/12, 1/00
U.S. Cl. 29—105                                      4 Claims

ABSTRACT OF THE DISCLOSURE

A rotary end mill cutter utilizing replaceable cutting inserts positioned at a positive axial rake angle and constructed in a way to achieve a straight wall configuration in a milled slot in much the same manner as an end mill having zero axial rake inserts, this being accomplished by a novel shaped cutting edge on the indexable inserts.

---

This invention relates to rotary end mills designed primarily for the cutting of metal and more particularly to an end mill utilizing positive rake positioning of replaceable inserts.

End milling of metal has long been accomplished by solid ground end mills and also replaceable insert end mills. When an end mill is provided with a neutral (zero) axial rake angle on the cutting edges, it can move through metal, leaving a reasonably straight wall. However, there are certain disadvantages to the neutral axial rake cutters. The chips do not discharge readily and are apt to dull the tool as they are pulled back into the groove or slot being cut. In many cases it is desirable to have a cutting action which is obtainable with positive axial rake angles. The positive axial rake cutting tends to move the chips up and away from the cutting area and the very nature of the positive rake cut makes for a smoother action and better tool life.

The problems of end milling with positive rake angles have been known and in some instances special spiralled faces have been ground or carbide has been ground or formed in a spiral shape to apply to the cutting edges of an end mill to approximate a straight side wall when an end mill is being used to form grooves or slots. However, in the use of throwaway type inserts for end mills, it is almost economically impossible to have a spiralled insert and the clamping forces are almost of necessity straight surfaces. Accordingly, the problem has been to provide an end mill of the throwaway type which would cut a straight walled slot when the inserts are disposed at axial rake angles in the tool.

It is an object then of the present invention to provide an indexable cutting insert in combination with a holder which will avoid the difficulties normally inherent in a straight edged tool with an axial rake.

Other objects and features of the invention will be apparent in the following description and claims wherein the principles of the invention are set out together with the use thereof in connection with the best mode of the invention presently contemplated.

Drawings accompany the disclosure and the various views thereof may be briefly described as:

FIG. 1, a side elevation of an assembled end mill construction in accordance with the present invention.

FIG. 2, a second side elevation showing the end mill rotated from the position of FIG. 1.

FIG. 3, a side elevation of a cutting insert for an end mill.

FIG. 4, an enlarged view of the cutting edge of a carbide insert.

FIG. 5, a view of a cutting edge of the insert from a modified position.

FIG. 6, an illustration of a slot cut by an end mill which is uncorrected for axial rake angles.

The problem which is created by axial rake angles can be readily observed by taking a cylindrical object and placing relative to it a straight edge ruler. When the edge of the ruler is placed on the surface of the cylinder in a direction parallel to the axis of the cylinder, it will match the surface exactly. This position will in a sense illustrate the neutral axial rake end mill. However, if the ruler is shifted to even a slight angle to the axis of the cylinder, it will be seen that the ruler contacts only at the center and there is space at each side of the contact point. This is what happens when an end mill with an axial rake is used to cut side walls.

In FIG. 1, a positive axial rake end mill is shown having a shank 10 with a head portion 12, the head portion being formed of two parts, one of which is a clamp portion 14 and the other of which is an integral portion 16 joined to the shank 10. The clamp portion is held on the other portion of the head by two screws 18. Clamped between the portions then are two or more blades 20 disposed at what is called a positive axial rake angle as illustrated in FIG. 2.

FIGS. 3, 4 and 5 illustrate the details of the inserts 20 which are preferably formed of a hard cutting material such as tungsten carbide. The rectangular insert has a front face 21 and a back face 23. The faces are connected by side edges 22 which are angled to diverge from the back face 23 to provide clearance. The actual outside edge 22 of the cutting insert is formed at the front face 21 preferably by grinding a land at this face to create a free edge 24 at face 21. The surface or land behind the free edge 24 blends into the edge 22 in a contoured surface 26. The shape of the free edge 24 is shown especially in FIG. 5. This free edge 24 has a definite radius and does not need to be cut as a true spiral. However, if the radius is properly adjusted to the diameter of the end mill in which the blades are used, it will provide an extremely straight wall in a slot as shown by the dotted lines in FIG. 6. It will be appreciated that since the inserts are indexable, the opposite edge 30 will also be shaped in the same manner as edge 22 but it is important that a fairly substantial portion of these edges be flat in order that they may provide a substantial seating area against the walls of the slots which are formed in the head portion 12 to receive the inserts.

The curved edge 24 and the land 26 behind it may be formed by setting up the insert in a helical fixture and passing the leading edge of the insert under a grinding wheel in a helical motion. For example, an insert for a 1″ diameter can be set at the face of a shaft and the shaft rotated in a helical path under a grinding wheel. The lead should be 25.586″ for a 1″ diameter and so on. In FIG. 5 dimension A would be about .002″ for this example. The cutting edge 24 may be formed in other ways also but it is the outer diameter of the cutting insert that receives the curved form to compensate for the axial rake angle of the insert in the holder. This can be determined mathematically or pragmatically by a suitable fixture.

An advantage of the device is that inherently the cutting edge being cut on a relief will never be in contact with the seating surface so it will be protected when faced against the bottom wall of the receiving recess. The inserts, of course, are indexable and clamping can be accomplished against the sides of the recesses which are flat and straight.

What is claimed as new is as follows:

1. A positive rake end mill for milling straight walls comprising:
   (a) a holder for cutting inserts having one or more peripheral recesses with sides and a bottom surface disposed at a positive axial rake angle, (b) a flat back-up surface forming the bottom surface of said recesses to provide a seat for a cutting insert, and (c) an indexable cutting insert disposed in each said recess comprising a substantially rectangular shaped element of a hard cutting material having front and back faces to lie adjacent the sides of said recess, and having angled edge surfaces between said faces to lie selectively against said back-up surface, and a land formed on each said edge surfaces adjacent the front face of the insert terminating in a curved cutting edge at said front face to compensate for the axial rake of the insert in the holder.

2. A cutting insert for an end mill to be disposed in an axial rake cutting position in an end mill to cut a straight wall comprising:

a cutting insert having a front face and a back face and at least one edge connecting said faces having an angle to provide clearance, said edge being provided with a land at the front face of the insert terminating at the front face in a curved cutting edge to form the outside diameter of an end mill, said land blending into the said edge in a curved line spaced from said front face.

3. An indexable cutting insert to be disposed in an axial rake cutting position in an end mill to cut a straight wall comprising:

a cutting insert having parallel front and back faces and side edges connecting said faces, said edges being disposed at equal angles to said front face to provide clearance, each said edge being provided with a land at the front face of the insert terminating at the front face in a curved cutting edge to form the outside diameter of an end mill, said land blending into said edge in a curved line spaced from said front face, each said edge being adapted to serve selectively as a back-up surface for the insert in a holder and as an outer surface in a cutting postion.

4. A positive rake end mill for milling straight walls comprising:

(a) a holder for cutting inserts having one or more peripheral recesses with opposed flat sides and a flat bottom surface disposed at a positive axial rake angle, said bottom surface forming a seat for a cutting insert, and (b) an idexable cutting insert disposed in each said recess comprising a substantially rectangular shaped element of a hard cutting material having flat front and back surfaces to lie adjacent the sides of said recess, and having angled flat edge surfaces between said faces to lie selectively against said back-up surface, and a land formed on each said edge surface in a back-off relation under the plane of each said edge surface adjacent the front face of the insert terminating in a curved cutting edge at said front face to compensate for the axial rake of the insert in the holder.

References Cited

UNITED STATES PATENTS

| | | | |
|---|---|---|---|
| 1,569,524 | 1/1926 | Noll | 29—105 |
| 2,212,012 | 8/1940 | Davidson | 29—105 |
| 2,683,920 | 7/1954 | Williams | 29—105 |

HARRISON L. HINSON, Primary Examiner

U.S. Cl. X.R.

29—95